United States Patent [19]

Liebert et al.

[11] 4,414,679
[45] Nov. 8, 1983

[54] X-RAY SENSITIVE ELECTROPHORETIC IMAGERS

[75] Inventors: Richard B. Liebert, Ridgefield, Conn.; Johan W. Haarman, Eindhoven, Netherlands

[73] Assignee: North American Philips Corporation, New York, N.Y.

[21] Appl. No.: 353,557

[22] Filed: Mar. 1, 1982

[51] Int. Cl.³ .................... H01J 31/49; H01J 31/50; G03G 13/00; G21K 1/00
[52] U.S. Cl. ..................................... 378/29; 378/154
[58] Field of Search ............... 378/28, 29, 154, 31, 378/30, 149; 250/363 S

[56] References Cited

U.S. PATENT DOCUMENTS

| | | | |
|---|---|---|---|
| 2,760,077 | 8/1956 | Longini | 378/154 |
| 3,643,092 | 2/1972 | Van der Feyst | 378/154 |
| 3,937,969 | 2/1976 | Muehllehner | 378/149 |
| 3,943,366 | 3/1976 | Platz et al. | 378/149 |
| 4,054,800 | 10/1977 | Leask | 378/149 |
| 4,057,726 | 11/1977 | Jaszczak | 378/149 |
| 4,125,776 | 11/1978 | Tosswill et al. | 378/149 |
| 4,147,932 | 4/1979 | Lewis | 378/29 |
| 4,274,002 | 6/1981 | Tomita | 250/363 S |

Primary Examiner—Alfred E. Smith
Assistant Examiner—T. N. Grigsby
Attorney, Agent, or Firm—Paul R. Miller

[57] ABSTRACT

A grid type substrate is constructed to support an X-ray sensitive material at one side of an electrophoretic display device. The grid structure may be X-ray absorbent material supported between X-ray transparent supports. Various arrangements of the X-ray absorbent grid may be provided.

18 Claims, 6 Drawing Figures

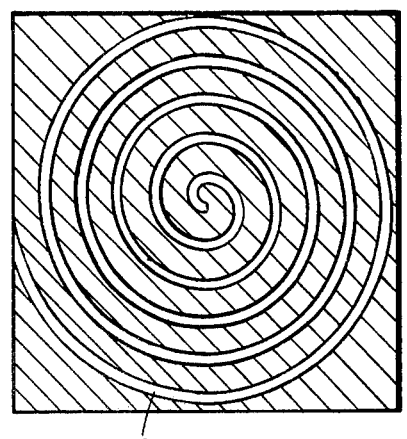
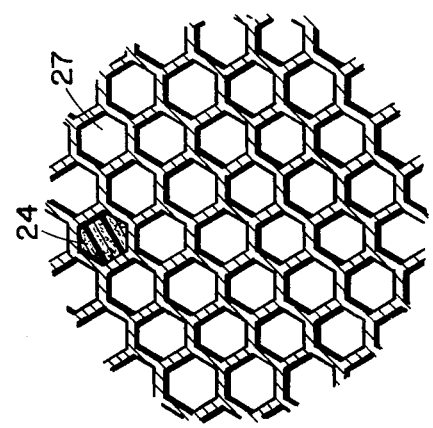
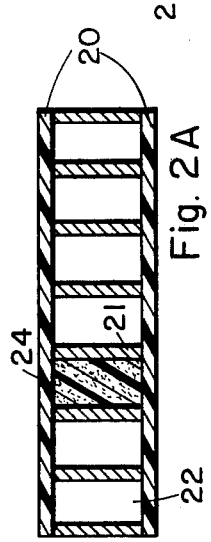
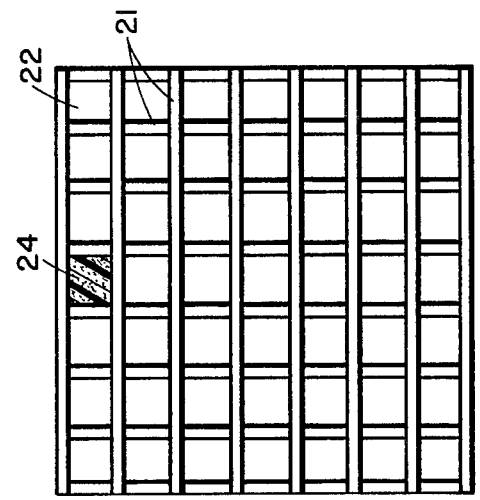
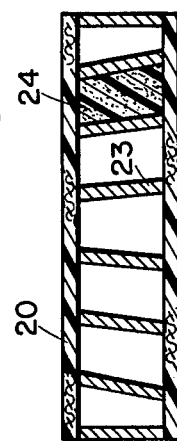
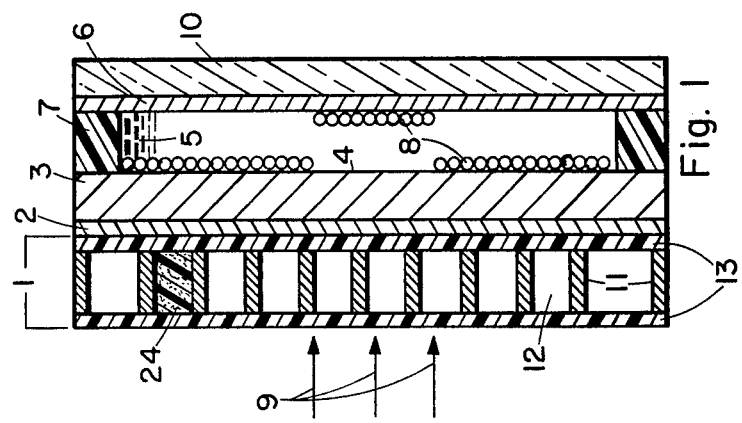

X-RAY SENSITIVE ELECTROPHORETIC IMAGERS

The present invention is directed to a new structure for use in X-ray type devices, particularly X-ray imaging structures.

Grid structures are commonly used to improve contrast in radiographs by selectively attenuating scattered radiation. Such grids may be parallel, focused, or crossed; and they may be stationary or moving. Various types of such grids may be seen by reference to the Physics of Radiology by H. E. Johns and J. R. Cunningham (Charles C. Thomas, Publisher, Third Edition, 1978, pgs. 614–617).

In X-ray sensitive electrophoretic imaging devices, such as seen in the article by Murau et al, AN ELECTROPHORETIC X-RAY IMAGING DEVICE, IEEE Transactions on Electron Devices, Vol. ED-26, No. 8, August 1979, pgs. 1153–1155, the X-ray sensitive material is deposited on a substrate. Such a substrate must be flat to allow for uniform deposition of the sensitive material, and subsequent fabrication of a cell having a parallel gap. In the event that the X-radiation is incident on the substrate, it should have low attenuation so that high sensitivity may be achieved. Thick layers of standard materials, such as aluminum or glass, could provide the required flatness and stiffness, but would have too large X-ray attenuation.

The present invention seeks to provide a substrate which incorporates a grid in order to increase stiffness and to provide attenuation of scattered radiation in an X-ray imaging device. A further advantage of the present invention is to provide a grid type substrate for supporting an X-ray sensitive electrophoretic imaging device.

Such a structure would involve a substrate being formed of two parallel supports with a grid-type structure sandwiched between the supports. Such an arrangement is known to provide great mechanical stiffness, as well as to achieve substantial attenuation of scattered radiation, while having good transmission for the primary X-radiation.

In this structure, an X-ray sensitive material can be supported on a substrate having the characteristics according to the present invention. Namely, the substrate involves a pair of X-ray transparent supports separated at a distance with a grid-type structure sandwiched between the supports.

The substrate supports may be formed of X-ray transparent material, such as low atomic number metals, graphite, plastics, or glass. The grid-type structure sandwiched between the supports may be formed of an X-ray absorber such as lead or bismuth.

The grid structures may be a simple parallel grid, a crossed-grid, a spiral type grid, a honey-comb type grid, or other non-square cross-section grid shapes. Moreover, they may be of the focused or non-focused type.

A further important feature according to the present invention involves the filling of spaces between the grids with a foam-in-place type material. In addition, the substrate supports may be strengthened with reinforcing fibers.

Construction of the substrate in accordance with the present invention may involve fabricating the substrate with the thin supports being under tension in order to obtain flatness. Alternatively, of course, the finished substrate may be worked with machine tools. Subsequent to the formation of the grid-type substrate, sensitive material may be deposited thereover and the structures be completed under normal fabrication techniques.

These various aspects of the present invention may be further understood by reference to the accompanying drawing figures which provide various examples without limitation, and wherein, FIG. 1 illustrates an X-ray sensitive, electrophoretic imager including the structure of the present invention, FIG. 2A illustrates a structure according to the present invention having a simple parallel construction in cross-section, FIG. 2B illustrates a crossed grid structure in plan view, FIG. 3A illustrates a focused parallel arrangement of the grid structure, FIG. 3B illustrates another arrangement of the grid structure, and FIG. 3C illustrates a still further arrangement of the grid structure.

The substrate structure according to the present invention may be seen in combination with an electrophoretic X-ray sensitive imager, such as seen in FIG. 1. In this drawing Figure, the substrate 1 according to the present invention forms a support material for the X-ray sensitive layer 3 which is provided at one side of an electrophoretic cell arrangement. The arrangement of the present invention includes in sequence the substrate 1 of the present invention, the electrode 2, and the X-ray sensitive layer 3, with a free surface 4 at one side of the electrophoretic cell. The electrophoretic cell includes the electrophoretic fluid 5 containing a dye material and the charged pigment particles 8 shown in bunches next to the free surface 4 or the transparent electrode 6 of the structure. Of course, the edges of the electrophoretic cell are sealed by seals 7 in order to prevent escape of the fluid and particles from the cell. A transparent substrate or faceplate 10 closes the electrophoretic cell and forms a viewing surface.

X-rays 9 are transmitted to the structure so that mobile charged carriers are produced in the X-ray sensitive section 3. These charged carriers are swept in an electric field placed across the cell until they reach the boundary surface 4 which separates the electrophoretic part of the cell from the X-ray sensitive part of the cell. Charge forming on the boundary surface 4 forms a latent charge image and causes a difference in potential to exist across the electrophoretic part of the cell. For example, if positive charge exists at the boundary surface 4, then negatively charged pigment will be attracted to the positive charges and develop the latent image. A visible image replica of the spacial distribution of the X-ray intensity is then formed.

A useful form of the substrate 1 utilized in the arrangement of FIG. 1 may be seen by reference to FIG. 2A. In this substrate arrangement, a simple parallel grid 21 is formed between the separated, opposite X-ray transparent supports 20. Air spaces 22 exist in areas between the grid sections. Alternatively, the structure may be given an increased stiffness by filling the spaces 22 between the grids with a foam-in-place material, such as 24 also illustrated in FIG. 2A.

The X-ray transparent supports 20 illustrated in FIG. 2A may be of graphite, glass, low atomic number metals, such as beryllium or aluminum, or plastics, such as polycarbonate, PMMA, or nylon. The grid material 21 may be an X-ray absorber, such as lead or bismuth.

The substrate structure as seen in FIG. 2A forms an arrangement having low attenuation when X radiation is incident normally thereon. Such a substrate structure may be utilized in the electrophoretic arrangement, as illustrated in FIG. 1 wherein electrophoretic cells as large as 14" by 17" are provided. Gaps between the electrodes 2 and 6 as illustrated in FIG. 1 may be from 50 microns to 200 microns.

An alternative arrangement to this structure may be seen in FIG. 3A in which a reinforced focused type grid is provided. As seen in cross section, the X-ray absorbers 23 are tilted in contrast to FIG. 2A. In such an arrangement, the layer 20 may also include reinforcing fibers made of boron or carbon, for example, running perpendicular to the grid structure.

Another arrangement of the grid structure is seen in FIG. 2B wherein the grid 25 is crossed. This crossed structure may also be focused in the manner of FIG. 3A.

Various other combinations of these grid structures are possible. For example, the spiral arrangement 26 in FIG. 3B or the honey-comb type arrangement 27 in FIG. 3C may be used. Other non-square crossed-grid shapes may be also used.

The substrate structure, as provided by the present invention may be utilized in various constructions not relying on electrophoretic arrangements. The only criteria is that the substrate of the present invention will be used in constructions where a flat, stiff substrate is required which has a low X-ray attenuation.

While various arrangements of the present invention have been described, it is not intended to limit the present invention to only the specifically described embodiments, and all modifications suggested from the description of the invention are intended to be included.

What we claim is:

1. In an X-ray sensitive structure including an X-ray sensitive material supported by a substrate-type material, the improvement comprising said substrate-type material being a pair of X-ray transparent supports separated at a distance, and a grid-type structure sandwiched between said supports, wherein spaces between said grid type structure are filled with a foamed-in-place material.

2. A structure according to claim 1, wherein said supports are one of graphite, glass, plastic, or low atomic number metal.

3. A structure according to claim 1, wherein said grid type structure is an x-ray absorber.

4. A structure according to claim 1, wherein said grid type structure is a parallel grid.

5. A structure according to claim 1, wherein said grid type structure is a crossed grid.

6. A structure according to claim 1, wherein said grid type structure is focused.

7. A structure according to claim 1, wherein said grid type structure is one of a spiral structure, a honey-comb structure, or a non-square structure.

8. An X-ray electrophoretic display device comprising an electrophoretic cell
   an X-ray sensitive material in contact with one side of said electrophoretic cell, and
   a substrate support for said X-ray sensitive material including a pair of X-ray transparent surfaces separated at a distance, and a grid-type structure sandwiched between said surfaces.

9. An X-ray type electrophoretic display device according to claim 8, wherein said X-ray transparent surfaces are one of graphite, glass, a low atomic number metal, or a plastic.

10. An X-ray type electrophoretic display device according to claim 9, wherein said low atomic number metal is one of aluminum or beryllium.

11. An X-ray type electrophoretic display device according to claim 9, wherein said plastic is one of polycarbonate, polymethylmethacrylate, or nylon.

12. An X-ray type electrophoretic display device according to claim 8, wherein said grid-type structure is an X-ray absorber.

13. An X-ray type electrophoretic display device according to claim 8, wherein spaces between said grid-type structure are filled with a foamed-in-place material.

14. An X-ray type electrophoretic display device according to claim 8, wherein said grid type structure is formed of lead.

15. An X-ray type electrophoretic display device according to claim 8, wherein said grid type structure is a parallel grid.

16. An X-ray type electrophoretic display device according to claim 8, wherein said grid type structure is a crossed grid.

17. An X-ray type electrophoretic display device according to claim 8, wherein said grid type structure is focused.

18. An X-ray type electrophoretic display device according to claim 8, wherein said grid type structure is one of a spiral structure, a honey-comb structure or a non-square structure.

* * * * *